(12) United States Patent
Evans

(10) Patent No.: US 7,447,361 B2
(45) Date of Patent: Nov. 4, 2008

(54) SYSTEM AND METHOD FOR GENERATING A CUSTOM FONT

(75) Inventor: Charles E. Evans, Corvallis, OR (US)

(73) Assignee: Marvell International, Ltd. (BM)

( * ) Notice: Subject to any disclaimer, the term of this patent is extended or adjusted under 35 U.S.C. 154(b) by 503 days.

(21) Appl. No.: 11/138,128

(22) Filed: May 26, 2005

(65) Prior Publication Data

US 2006/0269137 A1    Nov. 30, 2006

(51) Int. Cl.
*G06K 9/00* (2006.01)
(52) U.S. Cl. ............... 382/187; 382/182; 382/245; 345/177; 713/176; 715/207
(58) Field of Classification Search .......... 382/187
See application file for complete search history.

(56) References Cited

U.S. PATENT DOCUMENTS

| | | | | |
|---|---|---|---|---|
| 4,847,607 A | * | 7/1989 | Schoon | 345/469.1 |
| 4,870,498 A | * | 9/1989 | Schoon | 382/245 |
| 5,263,132 A | * | 11/1993 | Parker et al. | 715/207 |
| 5,291,243 A | * | 3/1994 | Heckman et al. | 399/3 |
| 5,640,466 A | * | 6/1997 | Huttenlocher et al. | 382/177 |
| 6,249,604 B1 | * | 6/2001 | Huttenlocher et al. | 382/174 |
| 6,600,490 B1 | * | 7/2003 | Brock et al. | 345/472 |
| 7,197,644 B2 | * | 3/2007 | Brewington | 713/176 |
| 2004/0223645 A1 | * | 11/2004 | Cliff | 382/186 |

OTHER PUBLICATIONS

"How to Make a Font Based on your own Handwriting;" Sep. 8, 2003. Feb. 14, 2005 <http://forum.high-logic.com/viewtopic.php?t=337>.
"Font Creator;" Feb. 14, 2005 <http://www.high-logic.com/fcp.html>.
"Revision history;" Feb. 14, 2005 <http://www.high-logic.com/fcphistory.html>.
"Font Creator Program 4.5;" Aug. 20, 2004. Feb. 14, 2005 <http://www.microsoft.com/typography/links/News.aspx?NID=3423>.
"Font Creator Program 4.0;" May 18, 2003. Feb. 14, 2005 <http://www.microsoft.com/typography/links/News.aspx?NID=2889>.
"Font Creator the Third-Released;" Oct. 8, 2000. Feb. 14, 2005 <http://www.microsoft.com/typography/links/News.aspx?NID=1539>.
Font Creation Tutorial for CorelDRAW V0.91; Aug. 23, 2001. Nov. 30, 2004 <http://www.hiddenglade.com/cdfonts.htm>.

* cited by examiner

*Primary Examiner*—Samir A Ahmed
*Assistant Examiner*—Aklilu K Woldemariam

(57) ABSTRACT

A processor is operable to identify characters in a file that represents a scanned image, and generate a font that includes the identified characters.

16 Claims, 2 Drawing Sheets

SYSTEM AND METHOD FOR GENERATING A CUSTOM FONT

BACKGROUND

A font is a computer file that "tells" an operating system or software application how to draw a particular collection of characters and symbols. Most operating systems and text-generating software applications have a standard set of fonts used to create the text a user sees on the screen.

When printing text from a computer, a user is typically limited to the selection of fonts available in the operating system or software application being used. If the user desires to print in a custom font that is not available in the operating system or software application, then the user typically has to compromise and choose from the limited selection of available fonts.

To print in a custom font, the user can often create the font using font-creation software. In general, font-creation software is designed for use by typographers and graphic designers, and involves the user creating and editing bitmap grids or glyphs for each character and symbol in the font. For example, to create a custom English language alphabet font, the user may create up to 52 (26 uppercase, 26 lowercase) individual characters. As a result, creating custom fonts is typically too complicated and time-consuming to be practical for the average computer user.

Accordingly, there is a need for a relatively fast and easy way to generate a custom font.

SUMMARY

An embodiment of the invention is a processor operable to identify characters in a file that represents a scanned image, and generate a font that includes the identified characters.

DETAILED DESCRIPTION

Figure 1:
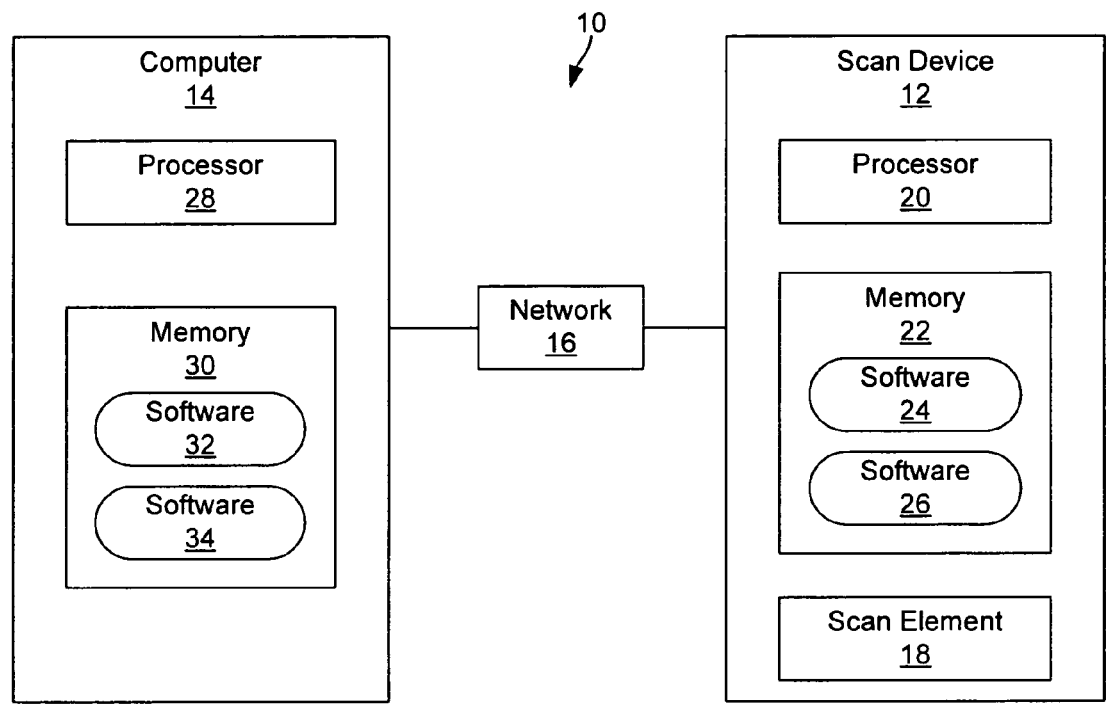
FIG. 1 is a block diagram of an electronic system according to an embodiment of the invention.

FIG. 1 is a block diagram of an electronic system 10 according to an embodiment of the invention. The electronic system 10 includes a scan device 12, which may be connected to an optional computer 14 by an optional network 16, such as a cable, a local area network (LAN), or the internet.

The scan device 12 includes a scan element 18 and may be a scanner, a copier, an inkjet printer, or any device that is capable of scanning an object such as a document or a medium such as paper, and producing a scanned image of the object. The scan element 18 may be an image sensor, such as a charge-coupled device (CCD) or a CMOS image sensor. The scan device 12 may further include a processor 20 and a memory 22, which may store a custom-font-generating software application 24, and which may also include a font storage section 26.

The computer 14 includes a processor 28 and a memory 30, which may store a custom-font-generating software application 32, and which may also include a font storage section 34. The font-generating application 32 may be the same as or different than the application 24. The storage locations in the memory 30 may be any type of digital storage. For example, the memory 30 may include semiconductor memory, magnetic storage, optical storage, and solid-state storage.

The network 16 may be any type of network connection between the scan device 12 and the computer 14, including a cable or a wireless channel.

Alternatively, the electronic system 10 may include only the scan device 12 without the computer 14 and the network 16. In this case, the software application 24 causes the scan device 12 to function as a stand-alone device, and utilizes the processor 20 to generate a custom font locally and to store the custom font in the font storage section 26 of the memory 22.

The software application 24 utilizes the processor 20 to cause the scan element 18 to scan a medium (not shown in FIG. 1) and to provide a scanned image to the processor 20. The medium includes characters and/or symbols which the user desires to convert into a custom font. Additional features of the medium are discussed in greater detail below in conjunction with FIG. 2.

The scanned image produced by the scan element 18 is then analyzed by the processor 20 while executing the software application 24. Specifically, the software application 24 causes the processor 20 to identify the character/symbol indicators of the scanned image that each signal the presence of a character or symbol. These indicators in the scanned image may be, for example, a registration mark (not shown in FIG. 1), a character edge/space (not shown in FIG. 1), or any other indicator in the scanned image.

The software application 24 then utilizes the processor 20 to identify the respective font character or symbol corresponding to each character/symbol indicator. For example, the processor 20 may recognize each of a number of registration marks as an indicator of a predetermined font character or symbol. In this case, a first registration mark may indicate the letter 'A', a second registration mark may indicate the letter 'B', and so forth. The registration marks may be the same, in which case the location of the mark (e.g., the first location) relative to the other marks identifies the character (e.g., 'A'). Alternatively, each registration mark may be different than the other registration marks, and thus uniquely identify a predetermined character or symbol independent of location. Furthermore, the character symbol indicators may be the character edges and spaces between the characters/symbols, where each location of the sequence is predetermined to represent a specific font character or symbol. In this case, a first character edge may be predetermined to represent the letter 'A', a second character edge following a first space may be predetermined to represent the letter 'B', and so forth.

The processor 20 then assigns each portion of the scanned image corresponding to an identified character/symbol indicator to a font file corresponding to the respective font character or symbol. These font files may be in any format, and may include bitmapped fonts or scalable fonts such as Post-Script, TrueType, and OpenType fonts. In addition, the processor 20 may modify these font files to create additional font files representing bold, italics and other variations of the font characters or symbols.

The processor 20 then saves the font files in the font storage section 26 of the memory 22. By saving the font files in the memory 22 of the scan device 12, no computer or external memory is required to store the font files. In the case that the scan device 12 includes an inkjet printing assembly, because the font files are stored locally in the scan device 12, it is not necessary for a computer such as computer 14 to send the font files to the scan device 12 during a print request; the computer need only send a font-selection value (to identify the font to be used) and character/symbol identifiers to the printer assembly of the device 12.

Where the electronic system 10 includes the computer 14 and the network 16 in addition to the scan device 12, the processor 28 and the memory 30 in the computer 14 may perform the above-described tasks. As a result, the software application 32 causes the scan device 12 to function as a peripheral device and utilizes the processor 28 to generate a custom font in the computer 14 and store the custom font in the font storage section 34 of the memory 30.

The software application 32 also utilizes the processor 28 to cause the scan element 18 in the scan device 12 to scan a medium and provide a scanned image to the processor 28 over the network 16.

The remaining operation of the software application 32 and the processor 28 is similar to the operation of the software application 24 and the processor 20 as described above. However, the processor 28 saves the font files in the font storage section 34 of the memory 30. By saving the font files in the memory 30 of the computer 14, the processor 28 is able to access the font files regardless of the peripheral devices used. For example, the computer 14 can cause a printer (not shown in FIG. 1) to print using the custom font by transmitting the font to the printer. In addition, saving the font files in the memory 30 allows the processor 28 of the computer 14 to use and manipulate the font files for additional software applications such as MS Word®.

In yet another alternative of the electronic system 10, the software applications 24 and 32 and the processors 20 and 28 may cooperate to generate a custom font and store the custom font in either, or both, of the font storage sections 26 and 34.

Figure 2:
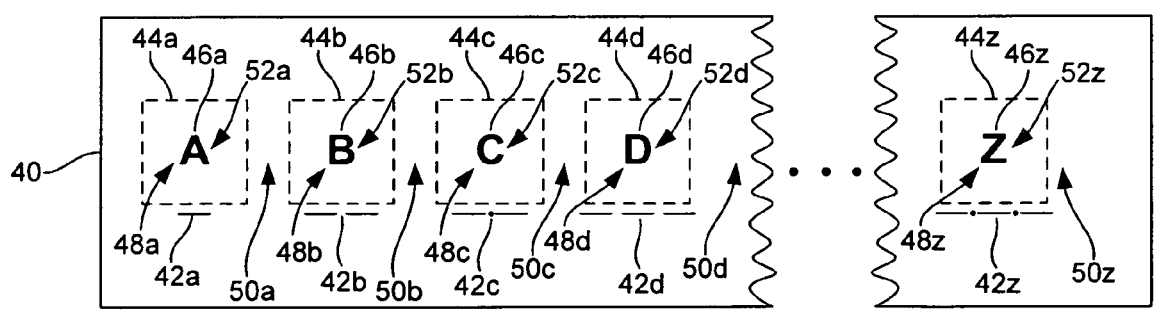
FIG. 2 is a diagram of a scannable medium used by a scan device according to an embodiment of the invention.

FIG. 2 is a diagram of a scannable medium 40 that can be scanned by the scan device 12 of FIG. 1 or by another scanner (not shown) according to an embodiment of the invention. Although interpreting the medium 40 is discussed below in conjunction with the processor 20, memory 22, and software application 24 of the scan device 12, it is to be understood that this interpretation may be performed by the processor 28, memory 30, and software application 32 of the computer 14 of FIG. 1.

The scannable medium 40 includes character/symbol indicators, here registration marks 42a-42z, character locations 44a-44z, characters 46a-46z, character edges 48a-48z, and spaces 50a-50z. Although shown as approximately the same size as the characters 46, the character locations 44 may be much larger so that a user (not shown) is provided some flexibility as to where to place each of the characters.

The registration marks 42a-42z may be used by the processor 20 (FIG. 1) to identify the portions of the medium 40 (here the character locations 44) representing character/symbol locations. The registration marks 42a-42z may be any type of mark or combination of marks recognized by the processor 20 and software application 24. In addition, the registration marks 42a-42z may be positioned anywhere on the medium 40. For example, the registration marks 42a-42z may be aligned in a straight line as shown in FIG. 2.

Each registration mark 42a-42z identifies a corresponding character location 44a-44z, and the character locations may be positioned relative to the registration marks 42a-42z in any predetermined manner. For example, the character locations 44a-44z may be positioned above the registration marks 42a-42z (as shown in FIG. 2), below the registration marks, to the side of the registration marks, or adjacent to the registration marks in some other manner. The characters 46a-46z of the desired font are created or drawn at the character locations 44a-44z. The example shown in FIG. 2 corresponds to an English language alphabet font having 52 characters 46 (only five characters 46a-46d and 46z are shown in FIG. 2).

The number of registration marks may vary depending on the number and type of font characters in the desired font. For example, the desired font may be for an alphabet other than the English language alphabet, or may include numerals and symbols in addition to letters. The desired font may also include upper and lower case letters, italics and bold. In any case, the software application 24 may be calibrated to recognize any number of registration marks depending on the desired font.

Alternatively, the character edges 48a-48z and the spaces 50a-50z may be used by the processor 20 to identify the character locations 44a-44z, and thus the corresponding characters 46a-46z. For example, the processor 20 may detect a first character edge 48a to indicate the first character 46a. Then after detecting a first space 50a, the processor 20 may detect a second character edge 48b to indicate the second character 46b. This process may be repeated until the processor 20 detects the last character edge 48z and the last space 50z—the processor 20 may recognize the space 50z as being the last space by failing to detect a subsequent character edge within a certain amount of time or within a predetermined scanning distance of the scan device 12. Furthermore, the processor 20 may use any type of edge-detection algorithm, including an optical character recognition (OCR) algorithm.

Similarly, the character edges 48a-48z may be used as front edges to identify the beginning of each of the character locations 44a-44z. But instead of using the spaces 50a-50z to identify the end of one character location 44a-44z and the beginning of another character location, back edges 52a-52z may be used to identify the end of each of the character locations. For example, the processor 20 may detect a first front edge 48a to indicate the beginning of the first character 46a, and a first back edge 52a to indicate the end of the first character 46a. This process may be repeated until the processor 20 detects the last front edge 48z and the last back edge 52z.

Alternatively, the character locations 44a-44z may be programmed into the software application 24 of the scan device 12, so that the processor 20 is able to identify these predetermined locations 44a-44z as containing characters/symbols without the use of any indicators on the scannable medium 40.

The scannable medium 40 may be formed of any material capable of being written or printed on. For example, the scannable medium 40 may comprise paper, and the characters 46a-46z may be hand-drawn directly on the paper. In addition, the scannable medium 40 may be any shape. For example, the scannable medium 40 may be shaped as a strip of paper so that the characters 46a-46z are aligned in a straight line (as shown in FIG. 2), or the scannable medium 40 may be shaped so that the characters 46a-46z are arranged in multiple lines or columns. Furthermore, the medium 40 may be pre-printed and sold with the registration marks 42, or the software application 24 may be able to cause the printing mechanism of the scan device 12 to print the registration marks 42 on a blank medium. The user may then draw characters on the medium 40 within the character locations 44. Similarly, the software application 32 can cause a printer (not shown) coupled to the computer 14 to print the registration marks 42 on a blank medium 40.

Figure 3:
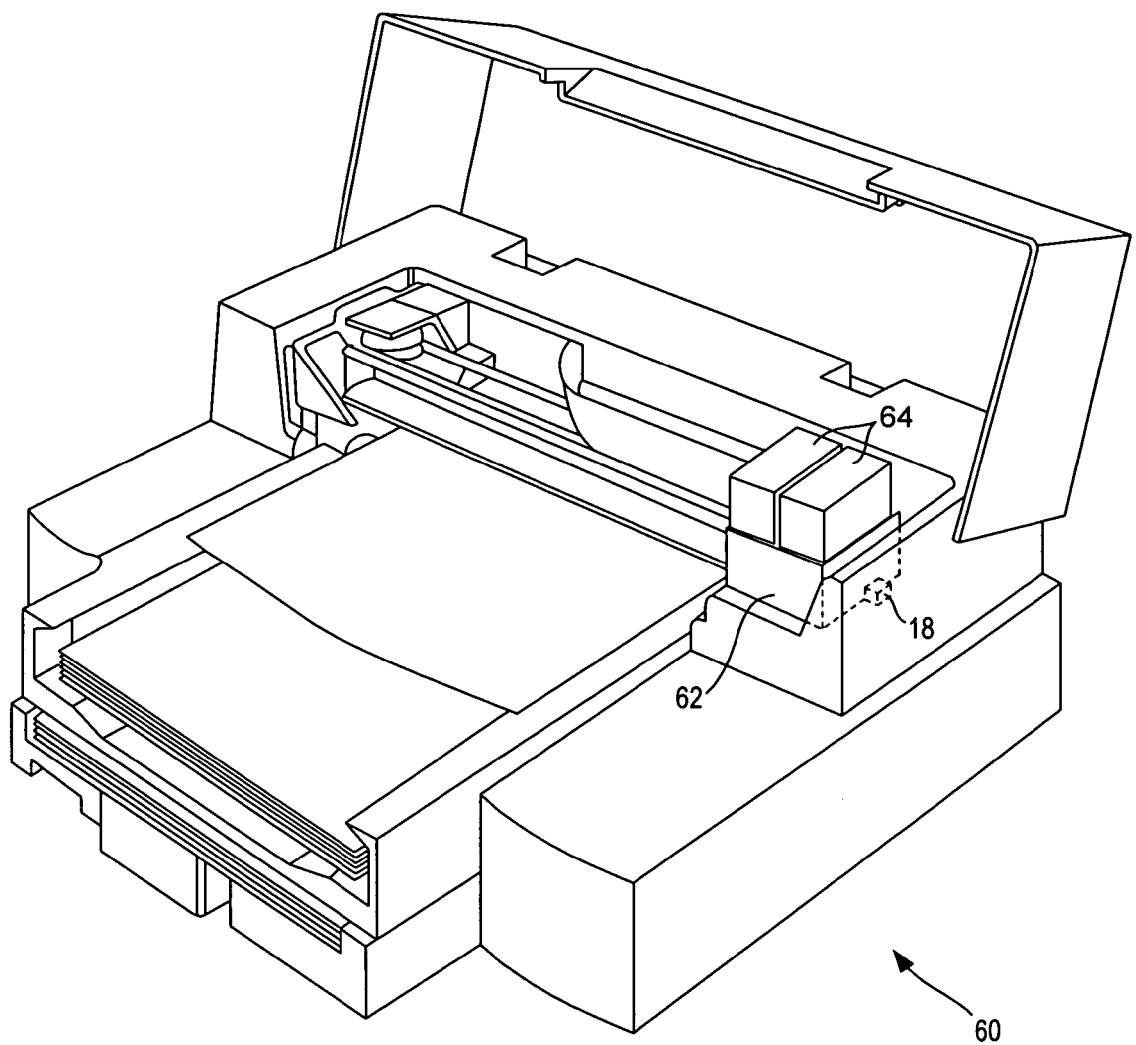
FIG. 3 is a perspective view of an embodiment of a scan device as an inkjet printer incorporating a scan element.

FIG. 3 is a perspective view of an embodiment of the scan device 12, where the device is an inkjet printer 60. The inkjet printer 60 includes a printhead (not shown) mounted within a carriage 62, an ink cartridge 64, and a scan element 18. Typical inkjet printhead assemblies include built-in scanners, such as the scan element 18, to calibrate the position of the printhead. In this case, the scan element 18 may also be used to scan the medium 40 (FIG. 2) and provide a scanned image to a processor for the purpose of generating a custom font. As a result, the inkjet printer 60 may function as both a printer and a scan device.

From the foregoing it will be appreciated that, although specific embodiments of the invention have been described herein for purposes of illustration, various modifications may be made without deviating from the spirit and scope of the invention.

What is claimed is:

1. An electronic device, comprising:
    a processor;
    a memory in communication with the processor, the memory configured to store a software application operable to:
        identify a plurality of registration marks;
        identify characters in a scanned image, wherein each of the characters corresponds to one of the plurality of registration marks in the scanned image;
        detect a front edge and a back edge of a respective portion of the scanned image;
        identify the character based on the detected front and back edges of the scanned image; and
        generate a font file that includes the identified characters.

2. The electronic device of claim 1, wherein
    identifying each of the characters in the scanned image by one of the plurality registration marks disposed adjacent thereto.

3. The electronic device of claim 1, wherein the processor is
    operable to identify each of the characters by:
    detecting an edge and a space of a respective portion of the image; and
    identifying the character as the portion of the image.

4. The electronic device of claim 1, further comprising a scan element operable to scan the image from a medium.

5. The electronic device of claim 4, wherein the scannable medium carries the registration mark and the character is disposed substantially adjacent to the registration mark.

6. The electronic device of claim 1, wherein the memory is configured to store the font.

7. The electronic device of claim 1, further comprising a print assembly operable to print registration marks on a scannable medium.

8. An electronic system, comprising:
    a processor;
    a memory in communication with the processor, the memory configured to store a software application operable to:
        identify a plurality of registration marks;
        identify characters in a file that represents a scanned image, wherein each of the characters corresponds to one of the plurality of registration marks;
        detect a front edge and a back edge of a respective portion of the scanned image;
        identify the character based on the detected front and back edges of the scanned image; and
        generate a font that includes the identified characters.

9. The electronic system of claim 8 further comprising a scanner.

10. The electronic system of claim 8 further comprising an inkjet printer having a scan element.

11. A method of generating a font, the method comprising:
    identifying a plurality of registration marks;
    identifying characters in a file that represents a scanned image, wherein each of the characters corresponds to one of the plurality of registration marks, and wherein identifying each of the characters further includes:
    detecting a front edge and a back edge of a respective portion of the image;
    identifying the character based on the detected front and back edges of the image; and
    generating a font file that includes the identified characters.

12. The method of claim 11, further comprising:
    scanning a medium that includes the image; and
    generating the font file from the scanned image.

13. The method of claim 12, wherein scanning the image comprises utilizing a scan element in an inkjet printhead assembly.

14. The method of claim 11, wherein identifying each of the characters comprises:
    detecting an edge and a space of a respective portion of the image; and
    identifying the character based on the detected edge and space of the image.

15. The method of claim 11, further comprising storing the font file in the memory.

16. The method of claim 11, further comprising providing the plurality of registration marks on a medium before scanning the medium.

* * * * *